(12) United States Patent
Yamada et al.

(10) Patent No.: US 8,542,309 B2
(45) Date of Patent: Sep. 24, 2013

(54) WAFER-LEVEL LENS ARRAY, METHOD OF MANUFACTURING WAFER-LEVEL LENS ARRAY, LENS MODULE AND IMAGING UNIT

(75) Inventors: Daisuke Yamada, Saitama (JP); Ryo Matsuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 324 days.

(21) Appl. No.: 12/880,477

(22) Filed: Sep. 13, 2010

(65) Prior Publication Data

US 2011/0063487 A1    Mar. 17, 2011

(30) Foreign Application Priority Data

Sep. 14, 2009 (JP) ................ P2009-211853

(51) Int. Cl.
*H04N 5/225* (2006.01)
*G02B 27/10* (2006.01)
*G02B 3/00* (2006.01)
*B29D 11/00* (2006.01)

(52) U.S. Cl.
USPC ........................ 348/340; 359/619; 264/1.32

(58) Field of Classification Search
USPC ............... 348/340; 359/622, 619, 621, 454, 359/793, 819; 427/162; 264/1.1, 1.32, 2.7; 257/432
See application file for complete search history.

(56) References Cited

U.S. PATENT DOCUMENTS 6,324,010 B1 * 11/2001 Bowen et al. ............. 359/622
2004/0047274 A1    3/2004 Amanai
2004/0067015 A1 *  4/2004 Nakajima ................. 385/33
2005/0074702 A1 *  4/2005 Lee et al. ................. 430/321
2005/0254133 A1 * 11/2005 Akram et al. ............. 359/626
2007/0019102 A1 *  1/2007 Nakajo et al. ............ 348/340
2009/0053408 A1    2/2009 Chien
2009/0279188 A1   11/2009 Do
2010/0046096 A1    2/2010 Hirao et al.
2010/0181691 A1    7/2010 Yoshida

FOREIGN PATENT DOCUMENTS

| EP | 1 903 608 A1 | 3/2008 |
| JP | 8-248207 A | 9/1996 |
| JP | 2000-98102 A | 4/2000 |
| JP | 2002-290842 A | 10/2002 |
| JP | 2004-88713 A | 3/2004 |

(Continued)

OTHER PUBLICATIONS

Extended European Search Report dated Dec. 1, 2010 for Application No. 10176386.0.

(Continued)

*Primary Examiner* — Kelly L Jerabek
(74) *Attorney, Agent, or Firm* — Birch, Stewart, Kolasch & Birch, LLP

(57) ABSTRACT

Disclosed are a wafer-level lens array, a method of manufacturing a wafer-level lens array, a lens module, and an imaging unit that can prevent the influence of, for example, the shrinkage of a forming material, prevent the positional deviation between lenses when the wafer-level lens arrays overlap each other or when the wafer-level lens array overlaps an imaging element array, and be easily designed.
A method of manufacturing a wafer-level lens array including a substrate unit and a plurality of lens units that is arranged on the substrate unit includes: forming the substrate unit; and integrally forming the lens units that are made of a resin having substantially the same optical characteristics as a material forming the substrate unit with the substrate unit.

12 Claims, 15 Drawing Sheets

(56) References Cited

FOREIGN PATENT DOCUMENTS

| | | |
|---|---|---|
| JP | 2005-215417 A | 8/2005 |
| JP | 3926380 B1 | 6/2007 |
| JP | 2008-152040 A | 7/2008 |
| WO | WO 2008/102648 A1 | 8/2008 |
| WO | WO 2008/153102 A1 | 12/2008 |
| WO | WO 2009/067832 A1 | 6/2009 |
| WO | WO 2009/088241 A2 | 7/2009 |

OTHER PUBLICATIONS

Japanese Office Action issued on Feb. 19, 2013 in Japanese Application 2009-211853.

* cited by examiner

WAFER-LEVEL LENS ARRAY, METHOD OF MANUFACTURING WAFER-LEVEL LENS ARRAY, LENS MODULE AND IMAGING UNIT

CROSS-REFERENCE TO RELATED APPLICATIONS

This application is based upon and claims the benefit of priority from the Japanese Patent Application No. 2009-211853 filed on Sep. 14, 2009; the entire contents of which are incorporated herein by reference.

BACKGROUND OF THE INVENTION

1. Field of the Invention

The present invention relates to a wafer-level lens array, a method of manufacturing a wafer-level lens array, a lens module and an imaging unit.

2. Description of the Related Art

In recent years, portable terminals of electronic apparatuses, such as mobile phones or PDAs (Personal Digital Assistants), include small and thin imaging units. In general, the imaging unit includes a solid-state imaging element, such as a CCD (Charge Coupled Device) image sensor or a CMOS (Complementary Metal-Oxide Semiconductor) image sensor, and a lens for forming an object image on the solid-state imaging element.

With a reduction in the size and thickness of the portable terminal, there has been a demand for a small and thin imaging unit. In addition, it is preferable to make a manufacturing process efficient in order to reduce the costs of a portable terminal. As a method of manufacturing a plurality of small lenses, a method has been proposed which manufactures a wafer-level lens array in which a plurality of lenses is formed on a substrate unit and cutting the substrate unit into a plurality of lenses, thereby mass-producing lens modules.

In addition, a method has been proposed which integrates a substrate having a plurality of lenses formed thereon with a semiconductor wafer having a plurality of solid-state imaging elements formed thereon and cutting the substrate and the semiconductor wafer lens into sets of the lenses and the solid-state imaging elements, thereby mass-producing imaging units.

As a method of manufacturing a wafer-level lens, for example, there is a method of manufacturing a wafer-level lens array using the following processes, which is disclosed in WO 2008/153102 (corresponding to US-A-2010/0181691).

(1) With a resin applied onto a wafer, the shape of one transfer body (mold) is transferred to the resin.

(2) The process of transferring the shape of the mold is repeated about 1500 to 2400 times to form a master lens array having 1500 to 2400 lens shapes on one wafer.

(3) Metal ions, such as Ni ions, are deposited on the lens surface of the master lens array by electroforming to manufacture a stamper (Ni electroforming mold).

(4) The stampers are used as a pair of lens array forming molds and a photo-curable resin or a thermosetting resin is supplied to the lower lens array forming mold of the pair of lens array forming molds.

(5) The upper lens array forming mold presses the supplied resin to deform the resin into a shape corresponding to the forming surfaces of the upper and lower lens array forming molds.

(6) Light or heat is applied to the resin to cure the resin, thereby forming a lens array.

For example, Japanese Patent No. 3926380 and WO 2008/102648 disclose an optical system including a composite lens obtained by bonding a lens unit to a parallel plate substrate.

Japanese Patent No. 3926380 (corresponding to US-A-2009/0279188) relates to the structure of an imaging lens including a composite lens in which lens units are bonded to both sides of a substrate made of a glass material. Japanese Patent No. 3926380 discloses a structure in which the difference between the refractive indexes of the two lens units of the composite lens is in the range of 0 to 0.1 and the difference between the Abbe numbers thereof is in the range of 0 to 30.

WO 2008/102648 (corresponding to US-A-2010/0046096) relates to the structure of an imaging lens including a lens substrate, which is a parallel plate, and a group of lenses that are formed on at least one surface of the lens substrate. WO 2008/102648 discloses a structure in which the difference between the Abbe number of a lens with a positive refractive power and the Abbe number of a lens with a negative refractive power is more than 10.

As in WO 2008/153102, when the substrate unit and the lens unit are integrally formed of the same material, it is inevitable that the resin used as the forming material is cured by light or heat and is shrunken, or it is expanded or contracted due to a temperature variation. When the resin is cured by light or heat and is shrunken, there is a concern that the lens unit will be shrunken in the diametric direction, and the shape of the lens surface will be greatly deformed.

In addition, the resin is not uniformly shrunken, or expanded or contracted in the entire wafer. Therefore, when the wafer-level lens arrays overlap each other or when the wafer-level lens array overlaps the imaging element array, there is a concern that the positional deviation between the lens units will occur due to shrinkage, or contraction or expansion.

As in Japanese Patent No. 3926380 and WO 2008/102648, when the substrate unit of the lens array and the lens unit are made of different materials, light is refracted at the interface between the substrate unit and the lens unit. As a result, the design becomes complicated. When the lens is used as an imaging lens, image quality deteriorates due to, for example, flare caused by the reflection of light from the interface.

SUMMARY OF THE INVENTION

An object of the invention is to provide a wafer-level lens array, a method of manufacturing a wafer-level lens array, a lens module, and an imaging unit that can prevent the influence of, for example, the shrinkage of a forming material, prevent the positional deviation between lenses when the wafer-level lens arrays overlap each other or when the wafer-level lens array overlaps an imaging element array, and be easily designed.

According to an embodiment of the invention, there is provided a method of manufacturing a wafer-level lens array including a substrate unit and a plurality of lens units that is arranged on the substrate unit. The method includes: forming the substrate unit; and integrally forming the lens units that are made of a resin having substantially the same optical characteristics as a material forming the substrate unit with the substrate unit.

In the manufacturing method, the substrate unit and a plurality of lens units are formed by different processes and are made of materials that substantially the same optical characteristics. Since the substrate unit and the plurality of lens units are formed by different processes, the lens units are not affected by shrinkage due to curing when the substrate unit is formed. Since the lens units are formed on the substrate unit, it is possible to prevent the positional deviation between the lens units.

Since the substrate unit and the plurality of lens units are made of materials having substantially the same optical characteristics, it is possible to prevent light from being refracted at the interface between the substrate unit and the lens unit, and the design is easy. In addition, when the lens unit is used as an imaging lens, no light is reflected from the interface. Therefore, it is possible to prevent deterioration of image quality due to, for example, flare.

According to the above-mentioned embodiment of the invention, since the substrate unit is formed beforehand, shrinkage due to curing does not occur in the substrate unit when the lens units are formed. Therefore, when a liquid resin on the substrate is deformed into a desired shape by the mold and is then cured, the resin is cured while being adhered to the surface of the substrate unit, and the amount of shrinkage of a portion of the resin that comes into contact with the substrate unit in a direction along the surface of the substrate unit is significantly less than the amount of shrinkage when the entire substrate unit is cured and shrunken at the same time. Therefore, it is possible to reduce the shrinkage of the lens unit in the diametric direction and form a high-quality lens unit, as compared to the structure in which the substrate unit is formed at the same time. When the wafer-level lens arrays overlap each other or when the wafer-level lens array overlaps the imaging element array, it is possible to provide a wafer-level lens array, a method of manufacturing a wafer-level lens array, a lens module, and an imaging unit that can prevent the positional deviation between the lenses and be easily designed.

DESCRIPTION OF THE PREFERRED EMBODIMENTS

First, the structure of a wafer-level lens array, a lens module, and an imaging unit according to an embodiment of the invention will be described.

Figure 1:
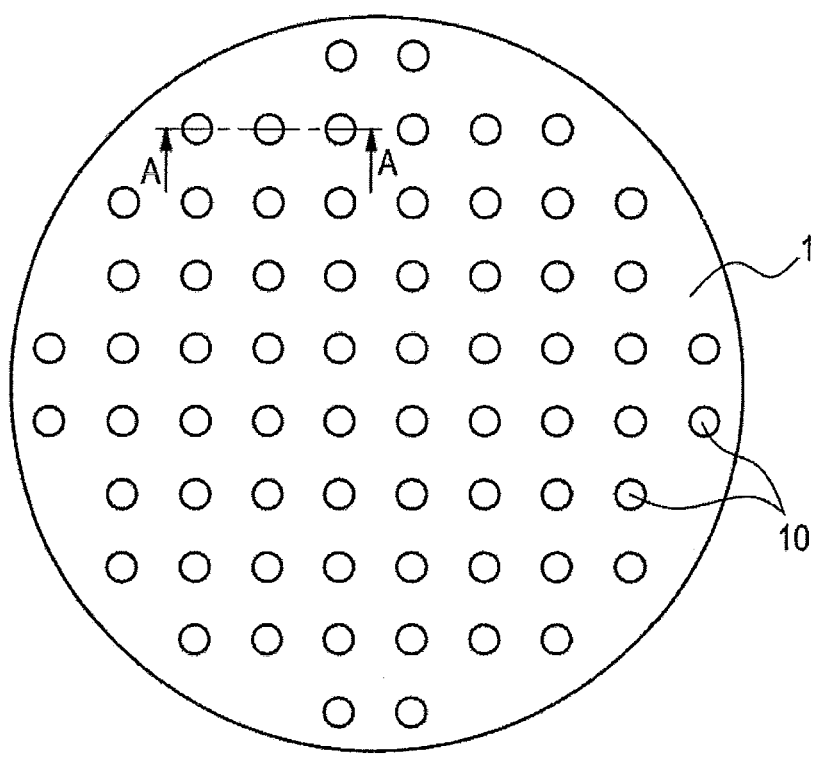
FIG. 1 is a plan view illustrating an example of the structure of a wafer-level lens array.
Figure 2:
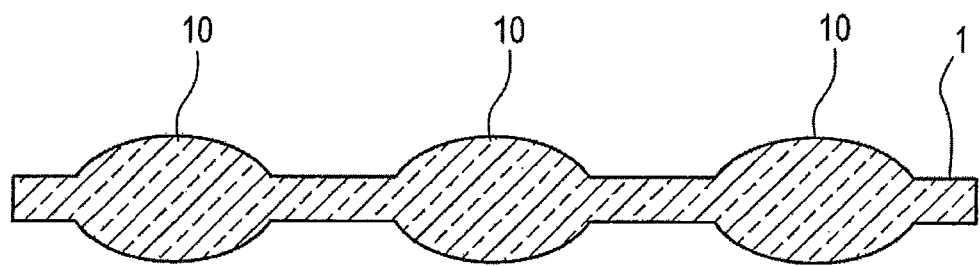
FIG. 2 is a cross-sectional view illustrating the structure of the wafer-level lens array taken along the line A-A of FIG. 1.

FIG. 1 is a plan view illustrating an example of the structure of the wafer-level lens array. FIG. 2 is a cross-sectional view illustrating the wafer-level lens array taken along the line A-A of FIG. 1.

The wafer-level lens array includes a substrate unit 1 and a plurality of lens units 10 that is arranged on the substrate unit 1. The plurality of lens units 10 is one-dimensionally or two-dimensionally arranged on the substrate unit 1. In this embodiment, as shown in FIG. 1, an example of the structure in which the plurality of lens units 10 is two-dimensionally arranged on the substrate unit 1 will be described. The lens units 10 are made of a resin that has substantially the same optical characteristics as that forming the substrate unit 1 and are formed integrally with the substrate unit 1. The shape of the lens unit 10 is not particularly limited, but is appropriately changed according to the purpose of use. The term 'resins having substantially the same optical characteristics' means that, when the resins forming the substrate unit 1 and the lens unit 10 are cured, the resins have substantially the same optical characteristics. Here, the term 'substantially the same optical characteristics' means that the difference between the refractive indexes (nd) is equal to or less than 0.01 and the difference between the Abbe numbers (vd) is equal to or less than 5 The difference between the refractive indexes (nd) is preferably equal to or less than 0.005, more preferably equal to or less than 0.003, and most preferably 0. The difference between the Abbe numbers (vd) is preferably equal to or less than 2, more preferably equal to or less than 1, and most preferably 0.

Figure 3:
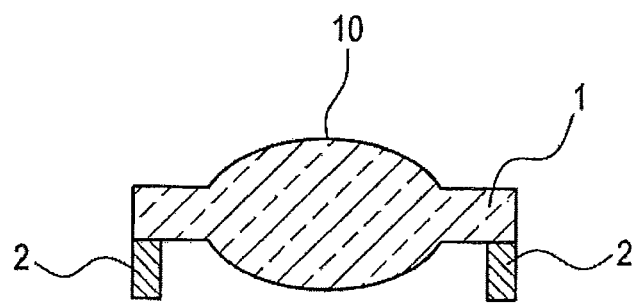
FIG. 3 is a cross-sectional view illustrating an example of the structure of a lens module.

FIG. 3 is a cross-sectional view illustrating an example of the structure of a lens module.

The lens module includes the substrate unit 1 and the lens unit 10 that is formed integrally with the substrate unit 1. For example, the lens module is formed by dicing the substrate unit 1 of the wafer-level lens array shown in FIGS. 1 and 2 into the lens units 10. A spacer 2 is provided around the lens unit 10 on one surface of the substrate unit 1. The operation and structure of the spacer 2 are the same as those of an imaging unit, which will be described.

Figure 4:
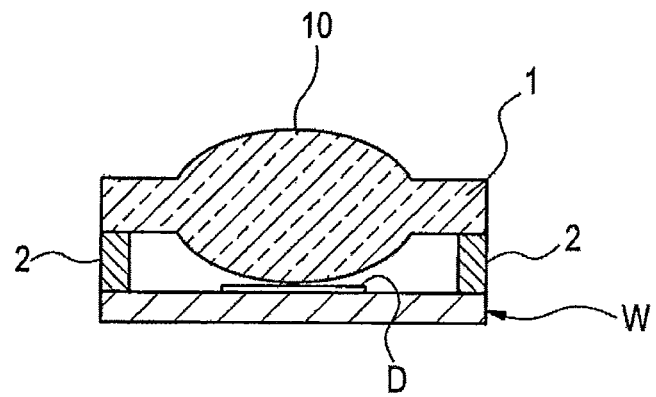
FIG. 4 is a cross-sectional view illustrating an example of the structure of an imaging unit.

FIG. 4 is a cross-sectional view illustrating an example of the structure of the imaging unit.

The imaging unit includes the lens module and a sensor module. The lens unit 10 of the lens module forms an object image on a solid-state imaging element D that is provided in the sensor module. The substrate unit 1 of the lens module and a semiconductor substrate W of the sensor module have a rectangular shape in a plan view such that they have substantially the same size.

The sensor module includes the semiconductor substrate W and the solid-state imaging element D that is provided on the semiconductor substrate W. For example, the semiconductor substrate W is formed by cutting a wafer made of a semiconductor material, such as silicon, in a substantially rectangular shape in a plan view. The solid-state imaging element D is provided substantially at the center of the semiconductor substrate W. The solid-state imaging element D is, for example, a CCD image sensor or a CMOS image sensor. The sensor module may be formed by bonding the solid-state imaging element D, which is a chip, onto the semiconductor substrate having wiring lines formed thereon. Alternatively, the solid-state imaging element D may be formed by repeatedly performing a process of forming known films on the semiconductor substrate W, a photolithography process, an etching process, and a process of adding impurities to form an electrode, an insulating film, and wiring lines on the semiconductor substrate.

In the lens module, the substrate unit 1 overlaps the semiconductor substrate W of the sensor module with the spacer 2 interposed therebetween. The spacer 2 of the lens module and the semiconductor substrate W of the sensor module are bonded to each other by, for example, an adhesive. The spacer 2 is designed such that the lens unit 10 of the lens module forms an object image on the solid-state imaging element D of the sensor module, and has such a thickness that the lens unit 10 does not contact the sensor module and there is a predetermined gap between the lens unit 10 and the solid-state imaging element D.

The shape of the spacer 2 is not particularly limited, but may be appropriately changed in the range in which the predetermined gap between the substrate unit 1 of the lens module and the semiconductor substrate W of the sensor module can be maintained. For example, the spacers 2 may be columnar members that are provided at four corners of the substrate. The spacer 2 may be a frame-shaped member that surrounds the solid-state imaging element D of the sensor module. When the solid-state imaging element D is surrounded by the frame-shaped spacer 2 and is isolated from the outside, it is possible to prevent light other than the light passing through the lens from being incident on the solid-state imaging element D. In addition, it is possible to prevent dust from adhering to the solid-state imaging element D by sealing the solid-state imaging element D from the outside.

The lens module shown in FIG. 3 includes one substrate unit 1 having the lens unit 10 formed thereon. However, the lens module may include a plurality of substrate units 1 each having the lens unit 10 formed thereon. In this case, the substrate units 1 that overlap each other are bonded to each other with the spacer 2 interposed therebetween.

The sensor module may be bonded to the lowest substrate unit 1 in the lens module including a plurality of substrate units 1 each having the lens unit 10 formed thereon, with the spacer 2 interposed therebetween, thereby forming an imaging unit. A method of manufacturing the lens module including a plurality of substrate units 1 each having the lens unit 10 formed thereon and the imaging unit including the lens module will be described below.

The imaging unit having the above-mentioned structure is mounted on a circuit board (not shown) that is provided in, for example, a portable terminal by reflow soldering. Paste solder is appropriately printed at the position where the imaging unit is mounted on the circuit board in advance, and the imaging unit is placed on the paste solder. Then, a heating process of radiating infrared rays to the circuit board including the imaging unit or blowing hot air to the circuit board is performed to fix the imaging unit to the circuit board.

The substrate unit 1 and the lens unit 10 are made of the same forming material (hereinafter, simply referred to as a material).

An energy-curable resin composition used in the wafer-level lens array according to the embodiment of the invention may be a resin composition that is cured by heat or a resin composition that is cured by active energy beams (for example, ultraviolet rays and electron beams).

It is preferable that the resin composition have appropriate fluidity in terms of moldability, such as the shape transfer property of a mold, before curing. Specifically, it is preferable that the resin composition be in a liquid state at a room temperature and have a viscosity of about 1000 to 50000 mPa·s.

It is preferable that the resin composition have a sufficient heat resistance not to be thermally deformed during a reflow process after curing. From this point of view, it is preferable that the glass transition temperature of the cured material be preferably equal to or more than 200° C., more preferably equal to or more than 250° C., and most preferably equal to or more than 300° C. It is necessary to restrict mobility at a molecular level in order to give high heat resistance to the resin composition. For example, the following methods may be effectively used to give high heat resistance to the resin composition: (1) a method of increasing crosslink density per unit volume; (2) a method of using a resin with a rigid ring structure (for example, resins with an alicyclic structure, such as cyclohexane, norbornane, or tetracyclododecane, an aromatic ring structure, such as benzene or naphthalene, a cardo structure, such as 9,9'-biphenylfluorene, and a spiro structure, such as spirobiindane; specifically, for example, resins disclosed in JP-A-9-137043, JP-A-10-67970, JP-A-2003-55316, JP-A-2007-334018, and JP-A-2007-238883); (3) a method of uniformly dispersing a high-Tg material, such as inorganic fine particles (for example, see JP-A-5-209027 and JP-A-10-298265). Some of the methods may be combined with each other, and the methods may be adjusted within the range in which other characteristics, such as fluidity, a shrinkage ratio, and refractive index characteristics, are not damaged.

A resin composition with a low volumetric shrinkage due to curing reaction is preferable in terms of shape transfer accuracy. The curing shrinkage of the resin composition used in the embodiment of the invention is preferably equal to or less than 10%, more preferably equal to or less than 5%, and most preferably equal to or less than 3%.

For example, as the resin composition with low curing shrinkage, any of the following resin compositions may be used: (1) a resin composition including a high-molecular-weight curing agent (for example, a prepolymer) (for example, see JP-A-2001-19740, JP-A-2004-302293, and JP-A-2007-211247; the number average molecular weight of the high-molecular-weight curing agent is preferably in the range of 200 to 100,000, more preferably in the range of 500 to 50,000, and most preferably in the range of 1,000 to 20,000; and a value obtained by the number average molecular weight of the curing agent by the number of curing reactive groups is preferably in the range of 50 to 10,000, more preferably in the range of 100 to 5,000, and most preferably in the range of 200 to 3,000); (2) a resin composition including a non-reactive material (for example, organic/inorganic fine particles and a non-reactive resin) (for example, see JP-A-6-298883, JP-A-2001-247793, and JP-A-2006-225434), (3) a resin composition including a low shrinkage cross-linking reactive group (for example, a ring-opening polymerizable group (for example, an epoxy group (for example, see JP-A-2004-210932), an oxetanyl group (for example, see JP-A-8-134405), an episulfide group (for example, see JP-A-2002-105110), a cyclic carbonate group (for example, see JP-A-7-62065), an ene/thiol curing group (for example, see JP-A-2003-20334), and a hydrosilylation curing group (for example, see JP-A-2005-15666))); (4) a resin composition including a resin with a rigid skeleton (for example, fluorene, adamantane, and isophorone) (for example, see JP-A-9-137043); (5) a resin composition with an interpenetrating network structure (a so-called IPN structure) including two kinds of monomers with different polymerizable groups (for example, see JP-A-2006-131868); and (6) a resin composition including an expansive material (for example, see JP-A-2004-2719 and JP-A-2008-238417). In the embodiment of the invention, the resin compositions may be appropriately used. It is preferable that the plurality of materials for reducing shrinkage due to curing be combined with each other (for example, a resin composition including fine particles and the prepolymer containing the ring-opening polymerizable group) in terms of the optimization of physical properties.

In the wafer-level lens array according to the embodiment of the invention, it is preferable to use two or more kinds of resin compositions with two large and small Abbe numbers.

The Abbe number (vd) of the resin with a large Abbe number is preferably equal to or more than 50, more preferably equal to or more than 55, and most preferably equal to or more than 60. The refractive index (nd) of the resin is preferably equal to or more than 1.52, more preferably equal to or more than 1.55, and most preferably equal to or more than 1.57.

As the resin, an aromatic resin is preferable. In particular, a resin with an alicyclic structure (for example, a resin with a ring structure, such as cyclohexane, norbornane, adamantine, tricyclodecane, or tetracyclododecane; specifically, for example, resins disclosed in JP-A-10-152551, JP-A-2002-212500, JP-A-2003-20334, JP-A-2004-210932, JP-A-2006-199790, JP-A-2007-2144, JP-A-2007-284650, and JP-A-2008-105999) is preferable.

The Abbe number (vd) of the resin with a small Abbe number is preferably equal to or less than 30, more preferably equal to or less than 25, and most preferably equal to or less than 20. The refractive index (nd) of the resin is preferably equal to or more than 1.60, more preferably equal to or more than 1.63, and most preferably equal to or more than 1.65.

As the resin, a resin with an aromatic structure is preferable. For example, a resin with the structure of 9,9'-diarylfluorene, naphthalene, benzothiazole, or benzotriazole (specifically, for example, resins disclosed in JP-A-60-38411, JP-A-10-67977, JP-A-2002-47335, JP-A-2003-238884, JP-A-2004-83855, JP-A-2005-325331, JP-A-2007-238883, WO 2006/095610, and Japanese Patent No. 2537540) is preferable.

It is preferable to disperse inorganic fine particles in the matrix of the resin according to the embodiment of the invention, in order to increase the refractive index or adjust the Abbe number. Examples of the inorganic fine particles include oxide fine particles, sulfide fine particles, selenide fine particles, and telluride fine particles. Specifically, for example, fine particles of zirconium oxide, titanium oxide, zinc oxide, tin oxide, niobium oxide, cerium oxide, aluminum oxide, lanthanum oxide, yttrium oxide, and zinc sulfide may be given as examples of the inorganic fine particles.

In particular, it is preferable that fine particles of lanthanum oxide, aluminum oxide, or zirconium oxide be dispersed in the resin with a large Abbe number and fine particles of titanium oxide, tin oxide, or zirconium oxide be dispersed in the resin with a small Abbe number. One kind of inorganic fine particles may be used, or two or more kinds of inorganic fine particles may be combined with each other. In addition, a compound including a plurality of components may be used. For various purposes, such as a reduction in photocatalytic activity and a reduction in water absorption, the inorganic fine particles may be doped with different kinds of metal materials, the surface layer may be covered with different kinds of metal oxides, such as silica and alumina, or the surface thereof may be modified by a silane coupling agent, a titanate coupling agent, or a dispersing agent including an organic acid (for example, carboxylic acids, sulfonic acids, phosphoric acids, and phosphonic acids) or an organic acid group. It is preferable that the number average particle size of the inorganic fine particles be generally in the range of about 1 nm to 1000 nm. However, when the number average particle size is too small, the properties of the material are likely to be changed. When the number average particle size is too large, the influence of the Rayleigh scattering becomes remarkable. Therefore, the number average particle size is preferably in the range of 1 nm to 15 nm, more preferably in the range of 2 nm to 10 nm, and most preferably in the range of 3 nm to 7 nm. It is preferable that the particle size of the inorganic fine particles be distributed in the narrow range. The monodisperse particle is defined in various ways. For example, the numerical range disclosed in JP-A-2006-160992 falls within a preferred particle diameter distribution range. The number average primary particle size may be measured by, for example, an X-ray diffractometer (XRD) or a transmission electron microscope (TEM). The refractive index of the inorganic fine particle with respect to a wavelength of 589 nm at a temperature of 22° C. is preferably in the range of 1.90 to 3.00, more preferably in the range of 1.90 to 2.70, and most preferably in the range of 2.00 to 2.70. The content of the inorganic fine particles in the resin is preferably equal to or more than 5 mass %, more preferably in the range of 10 mass % to 70 mass %, and most preferably in the range of 30 mass % to 60 mass %, in terms of transparency and an increase in refractive index.

For example, it is preferable to appropriately use a dispersing agent including a function group that reacts with a resin monomer forming the matrix (for example, see Examples disclosed in JP-A-2007-238884), a block copolymer including a hydrophobic segment and a hydrophilic segment (for example, see JP-A-2007-211164), or a resin having a function group that can form arbitrary chemical coupling to inorganic fine particles at the end of a polymer or a side chain (for example, see JP-A-2007-238929 and JP-A-2007-238930), in order to uniformly disperse fine particles in the resin composition.

The resin composition according to the embodiment of the invention may include an appropriate amount of additive, for example, a known mold release agent, such as a compound including a silicon-based or fluorine-based long chain alkyl group, or an antioxidizing agent, such as hindered phenol.

The curable resin composition according to the embodiment of the invention may include a curing catalyst or an initiator, if necessary. Specifically, for example, the curable resin composition may include a compound that accelerates curing reaction (radical polymerization or ion polymerization) by heat or active energy beams, which is disclosed in JP-A-2005-92099 (paragraphs (0063) to (0039)). The amount of curing reaction accelerant that is added depends on the kind of catalyst or initiator, or the position where the curing reaction occurs, and thus it is difficult to determine the amount of curing reaction accelerant. In general, the content of the curing reaction accelerant in the total solid of the curable resin composition is preferably in the range of about 0.1 mass % to 15 mass % and more preferably in the range of 0.5 mass % to 5 mass %.

It is possible to produce the curable resin composition according to the embodiment of the invention by appropriately combining the above-mentioned components. In this case, when other components can be dissolved in, for example, a liquid low-molecular-weight monomer (reactive diluent), it is not necessary to add a separate solvent. However, if not, it is possible to produce a curable resin composition by dissolving each component with a solvent. Any solvent may be used in the curable resin composition as long as it can be uniformly dissolved or dispersed without any precipitation of a composition. Specifically, for example, any of the following solvents may be used: a ketone-bases solvent (for example, acetone, methyl ethyl ketone, and methyl isobutyl ketone); an ester-based solvent (for example, ethyl acetate and butyl acetate); an ether-based solvent (for example, tetrahydrofuran and 1,4-dioxane); an alcohol-based solvent (for example, methanol, ethanol, isopropyl alcohol, butanol, and ethylene glycol); an aromatic hydrocarbon-based solvent (for example, toluene and xylene); and water. When the curable composition includes a solvent, the composition may be cast on a substrate and/or a mold, the solvent may be dried, and a mold shape transfer operation may be performed.

Next, a method of manufacturing the wafer-level lens array will be described in detail.

FIGS. 5A to 5D are diagrams illustrating the procedure of a process of manufacturing a mold for forming the lens units on the substrate unit.

Figure 5A:
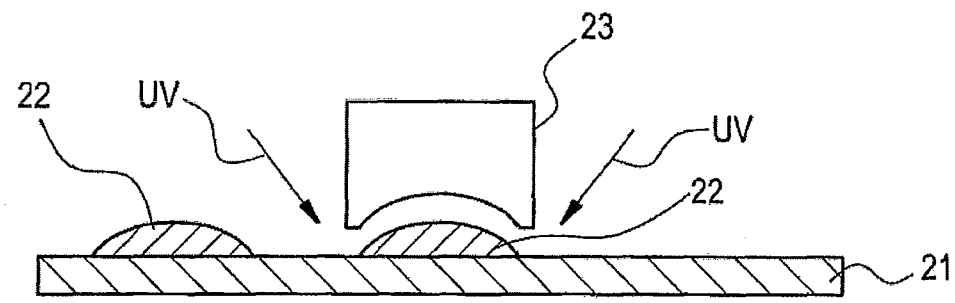
FIGS. 5A to 5D are diagrams illustrating the procedure of a process of manufacturing a mold for forming lens units on a substrate unit.
Figure 5B:
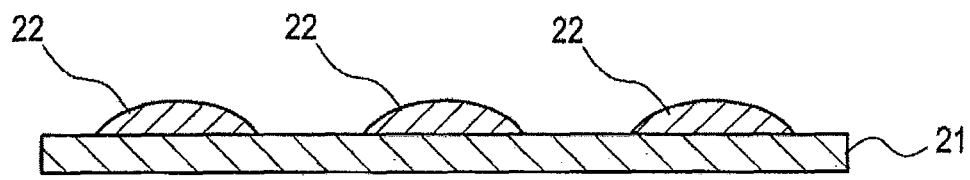

As shown in FIG. 5A, a transfer surface of a core 23 is transferred to an ultraviolet-curable resin (acryl or epoxy) on a glass substrate 21, and ultraviolet rays are radiated to form a replica lens 22. In this way, as shown in FIG. 5B, a master lens array with a desired lens array shape in which a plurality of replica lenses 22 is arranged on the glass substrate 21 is manufactured.

Figure 5C:
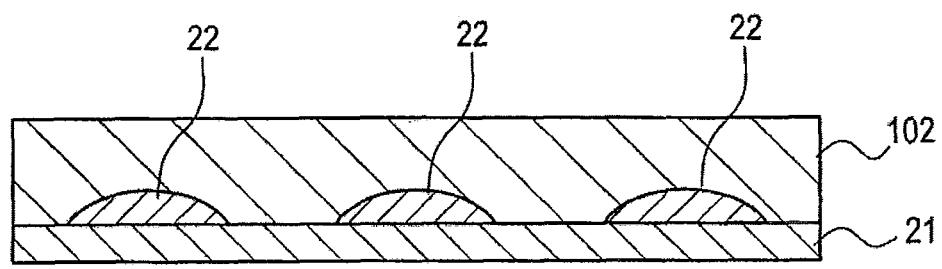

Then, as shown in FIG. 5C, metal ions, such as nickel (Ni) ions, are deposited on the lens surface of the master lens array by electroforming to manufacture a stamper (Ni electroforming mold) 102.

Figure 5D:
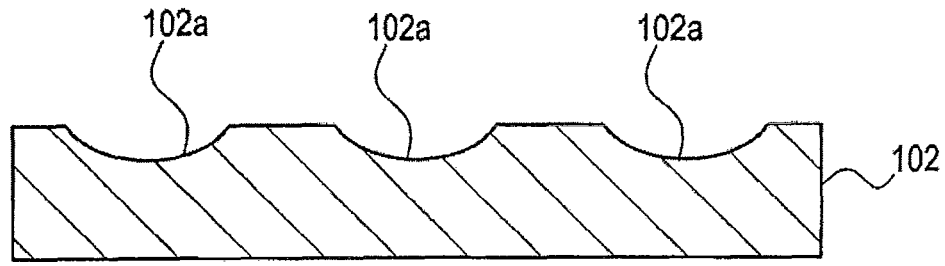

As shown in FIG. 5D, lens transfer portions 102a are provided in the stamper 102 separated from the master lens array. In this example, the lens transfer portion 102a has a concave shape, that is, a shape corresponding to the shape of a convex lens unit. However, the lens transfer portion 102a may have a shape corresponding to the shape of a concave or aspheric lens unit. In the following manufacturing process, the mold is not particularly limited to the stamper 102.

In the following description, the stamper 102 is simply referred to as a mold.

Figure 6:
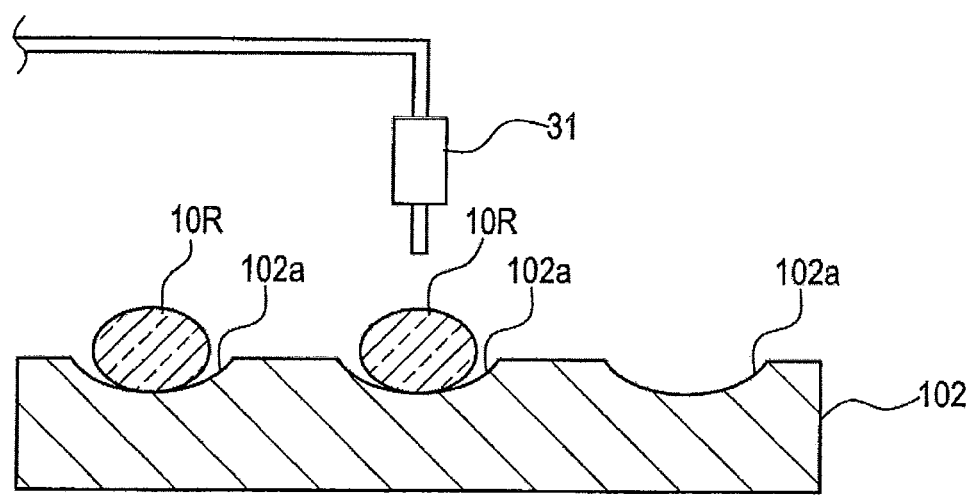
FIG. 6 is a diagram illustrating the supply of a resin which is a forming material.

FIG. 6 is a diagram illustrating the supply of a resin, which is a forming material, to the mold. As shown in FIG. 6, a resin 10R drops from a nozzle 31 of a dispenser to the lens transfer portion 102a of the mold 102. A predetermined amount of resin corresponding to one lens unit is supplied to the lens transfer portion 102a. The amount of resin 10R dropped to each lens transfer portion 102a is uniform, and is determined by the volume of a desired lens unit to be formed in the subsequent process. The resin supplied to the mold 102 is the same as that forming the substrate unit 1 that is manufactured by a separate process.

FIGS. 7A to 7D are diagrams illustrating the procedure of a process of forming the lens units integrally with the substrate unit.

First, the substrate unit 1 is prepared. In a method of manufacturing the substrate unit 1, first, a resin, which is a forming material, is supplied between a lower mold that transfers the shape of one surface of the substrate unit 1 and an upper mold that transfers the shape of the other surface of the substrate unit 1. In this embodiment, an ultraviolet-curable resin or a thermosetting resin is used as the forming material. Then, the upper and lower molds press the supplied resin into a wafer shape, and ultraviolet rays or heat is applied to the pressed resin to cure the resin, thereby forming the substrate unit.

The substrate unit may be formed by cutting a block made of the resin that is used as the forming material. The substrate unit may have a parallel plate shape. A structure, such as a warp preventing rib or a spacer, may be formed integrally with the substrate unit at the same time. Modifications of the substrate unit will be described below.

Figure 7A:
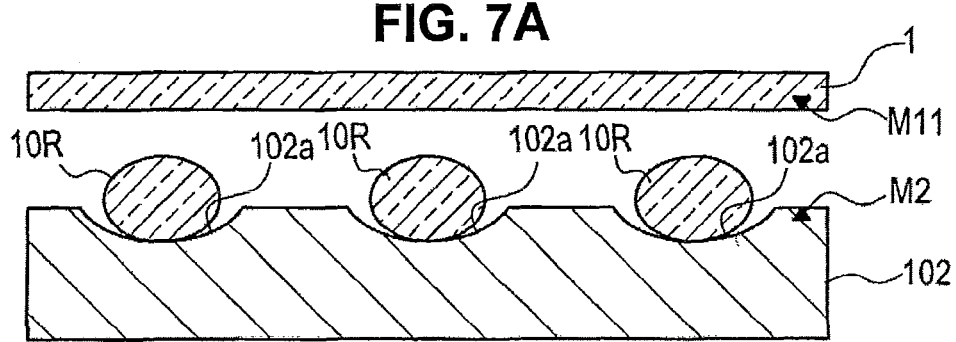
FIGS. 7A to 7D are diagrams illustrating the procedure of a process of forming the lens units integrally with the substrate unit.

As shown in FIG. 7A, the substrate unit 1 that is formed by a separate process is arranged on the mold 102 having the resin 10R supplied thereto in advance. The resin 10R supplied to the mold 102 is the same as that forming the substrate unit 1 that is formed by a separate process. The amount of resin 10R corresponding to one lens unit 10 is supplied to each of the lens transfer portions 102a of the mold 102.

Figure 7B:
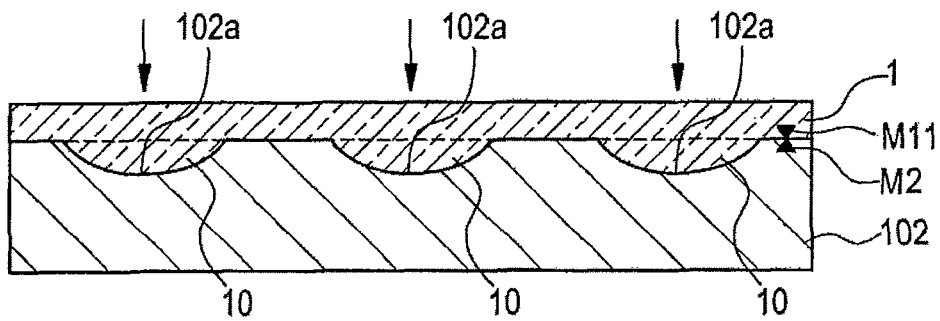

As shown in FIG. 7B, the substrate unit 1 overlaps the mold 102 and the resin 10R supplied to the lens transfer portions 102a of the mold 102 is pressed into a shape corresponding to the lens transfer portion 102a. A marking portion M11 is provided in the substrate unit 1 in order to position the mold 102 with respect to the substrate unit 1. In addition, a marking portion M2 that indicates a reference position with respect to the marking portion M11 of the substrate unit 1 with the substrate unit 1 overlapped with the mold 102 is provided in the mold 102. In this way, it is possible to easily position the substrate unit 1 with respect to the mold 102. Ultraviolet rays or heat is applied from the upper side of the substrate unit 1, with the substrate unit 1 overlapped with the mold 102. Then, the resin 10R is cured, and the lens units 10 are integrally formed on the lower surface of the substrate unit 1 in FIG. 7B. After the resin 10R is cured, the substrate unit 1 is separated from the mold 102.

Figure 7C:
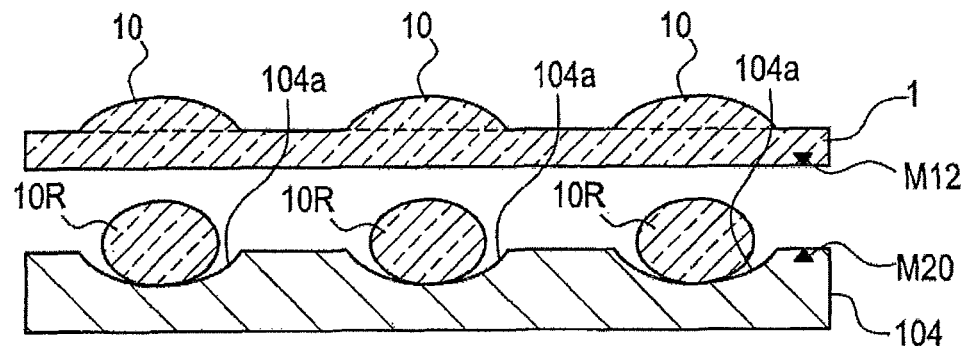

Then, as shown in FIG. 7C, the lens units 10 are formed on the surface of the substrate unit 1 on which the lens unit 10 is not formed. The substrate unit 1 is arranged with the surface having the lens units 10 formed thereon facing upward, and a mold 104 to which the resin 10R has been supplied is arranged below the substrate unit 1. The resin 10R is supplied to the mold 104 by the same procedure as that shown in FIG. 6 in which the resin 10R is supplied to the mold 102.

Figure 7D:
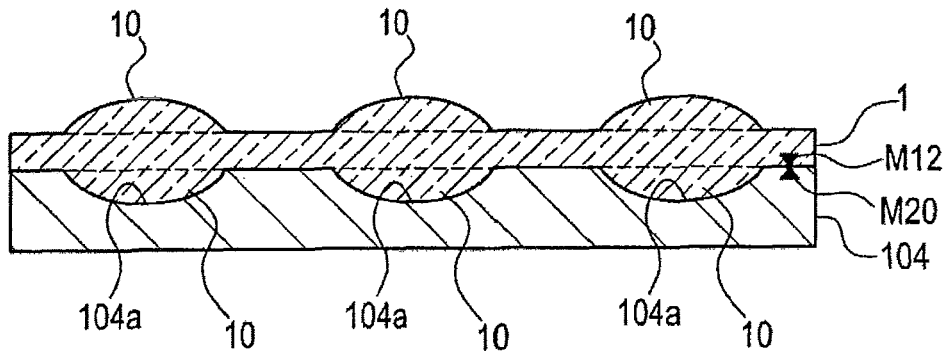

As shown in FIG. 7D, the substrate unit 1 overlaps the mold 104 and the resin 10R supplied to lens transfer portions 104a of the mold 104 is pressed into a shape corresponding to the lens transfer portion 104a. A marking portion M12 is provided in the substrate unit 1 in order to position the mold 104 with respect to the substrate unit 1. In addition, a marking portion M20 that indicates a reference position with respect to the marking portion M12 of the substrate unit 1 with the substrate unit 1 overlapped with the mold 104 is provided in the mold 104. In this way, it is possible to easily position the substrate unit 1 with respect to the mold 104. Ultraviolet rays or heat is applied from the upper side of the substrate unit 1, with the substrate unit 1 overlapped with the mold 104. Then, the resin 10R is cured, and the lens units 10 are integrally formed on the lower surface of the substrate unit 1 in FIG. 7D. After the resin 10R is cured, the substrate unit 1 is separated from the mold 104. In this way, it is possible to obtain a wafer-level lens array in which a plurality of lens units 10 is integrally formed on both surfaces of the substrate unit 1.

In the method of manufacturing the wafer-level lens array, the substrate unit 1 and the plurality of lens units 10 are made of the resins that have substantially the same optical characteristics by different processes. Since the substrate unit 1 and the plurality of lens units 10 are formed by different processes, it is possible to prevent the lens units 10 from being affected by shrinkage due to curing when the substrate unit 1 is formed. Since the lens units 10 are formed on the formed substrate unit 1, it is possible to prevent the positional deviation between the lens units 10.

In addition, since the substrate unit 1 and the plurality of lens units 10 are made of the materials that have substantially the same optical characteristics, it is possible to prevent the refraction of light at the interface between the substrate unit 1 and the lens unit 10, which facilitates the design. When the lens array is used as an imaging lens, it is possible to prevent deterioration of image quality due to, for example, flare since light is not reflected from the interface.

An example in which the lens unit 10 has a convex shape has been described above, but the shape of the lens unit 10 is not particularly limited. For example, the lens unit 10 may have a concave shape or an aspheric shape.

Figure 8A:
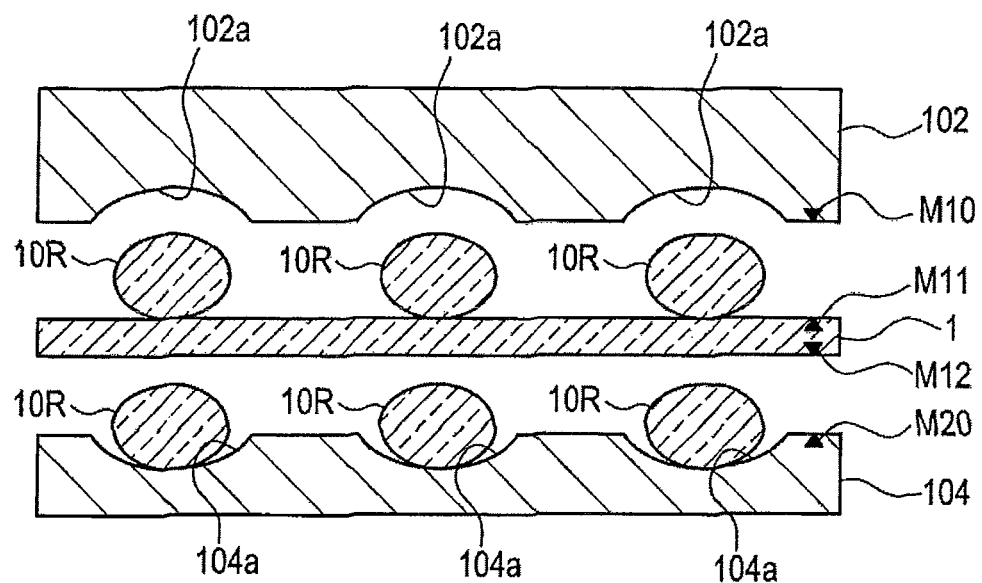
FIGS. 8A and 8B are diagrams illustrating another example of the procedure of the process of forming the lens units integrally with the substrate unit.
Figure 8B:
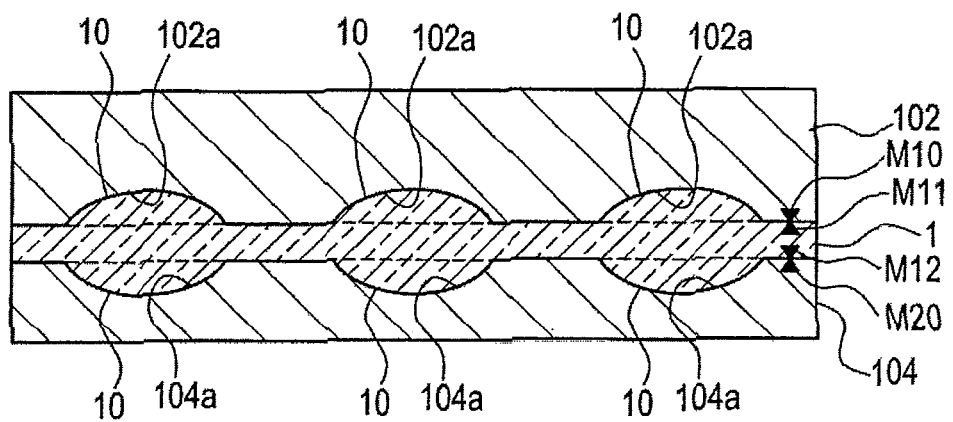

FIGS. 8A and 8B are diagrams illustrating the procedure of another process of forming the lens units integrally with the substrate unit.

As shown in FIG. 8A, the substrate unit 1 is arranged between a pair of the mold 102 and the mold 104. In this case, both the lens transfer portions 102a of the mold 102 and the lens transfer portions 104a of the mold 104 face the substrate unit 1. A resin is supplied to each of the lens transfer portions 104a of the mold 104 in advance.

The resin 10R is supplied to each of the portions in which the lens units 10 are formed on the surface of the substrate unit 1 facing the mold 102. The amount of resin 10R corresponding to one lens unit 10 is supplied to each portion of the substrate unit 1 where the lens unit 10 is formed. The resin 10R may be supplied to the substrate unit 1 in the same procedure as that shown in FIG. 6.

Then, as shown in FIG. 8B, the mold 102 and the mold 104 overlap each other with the substrate unit 1 interposed therebetween. The resin 10R supplied to the upper surface of the substrate unit 1 in FIG. 8B is deformed into the shape of the lens transfer portion 102a of the mold 102. The resin 10R supplied to the lens transfer portion 104a of the mold 104 is pressed by the substrate unit 1 and the lens transfer portion 104a to be deformed into the shape of the lens transfer portion 104a. Ultraviolet rays or heat is applied to cure the resin 10R, with the mold 102, the mold 104, and the substrate unit 1 overlapped with each other. In this way, it is possible to obtain a wafer-level lens array in which a plurality of lens units 10 is integrally formed on both surfaces of the substrate unit 1 at the same time.

As shown in FIGS. 8A and 8B, the marking portions M11, M12, M10, and M20 are provided in the substrate unit 1 and the molds 102 and 104. Therefore, it is possible to easily position the plurality of lens units 10 with respect to the substrate unit 1.

Figure 9:
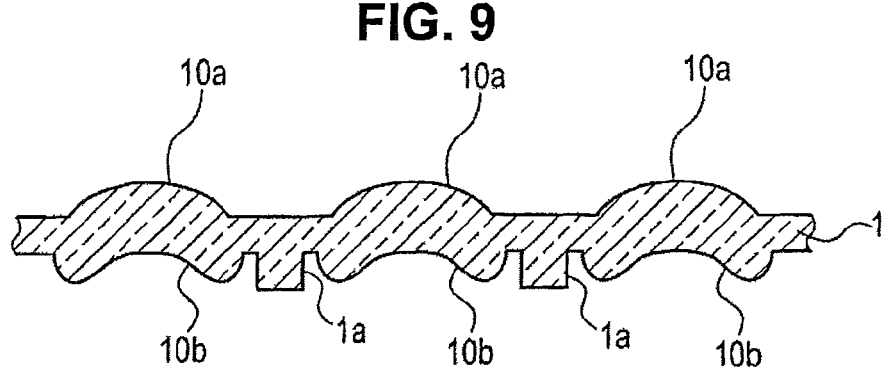
FIG. 9 is a cross-sectional view illustrating another example of the structure of the wafer-level lens array.

FIG. 9 is a cross-sectional view illustrating another example of the structure of the wafer-level lens array.

In the wafer-level lens array shown in FIG. 9, convex lens units 10a are integrally formed on one surface of the substrate unit 1 (in FIG. 9, the upper surface), and aspheric lens units 10b are integrally formed on the other surface (in FIG. 9, the lower surface). The substrate unit 1 and the lens units 10 are made of the same forming material, and an ultraviolet-curable resin or a thermosetting resin may be used as the forming material. The shapes of the lens units 10a and 10b are not particularly limited.

Concave portions 1a are provided in the surface of the substrate unit 1 on which the lens units 10b are formed. The concave portion 1a is wider than the portion in which the lens unit 10b is formed. The concave portions 1a are formed at the same time in the process of forming the substrate unit 1 before the lens units 10a and 10b are formed on the substrate unit 1. The concave portions 1a may be formed in both surfaces of the substrate unit 1 on which the lens units 10a and 10b are formed, or they may be formed in only one surface, as shown in FIG. 9.

Although not shown in FIG. 9, convex portions, not the concave portions 1a, may be formed. In this case, the convex portion is also wider than the portion in which the lens units 10a and 10b are formed.

When the concave portions 1a are formed in the substrate unit 1, the concave portions 1a may be provided at the same time as the substrate unit 1 is formed, or a process of cutting out portions corresponding to the concave portions 1a from the previously formed substrate unit 1 may be performed. Structures made of forming materials that have substantially the same optical characteristics may be integrally formed in portions other than the portions corresponding to the concave portions 1a of the substrate unit 1.

When the convex portions are provided on the substrate unit 1, the convex portions may be provided at the same time as the substrate unit 1 is formed, or a process of cutting out portions corresponding to the convex portions from the previously formed substrate unit 1 may be performed. Structures made of forming materials that have substantially the same optical characteristics may be integrally formed in portions other than the portions corresponding to the convex portions of the substrate unit 1.

Figure 10A:
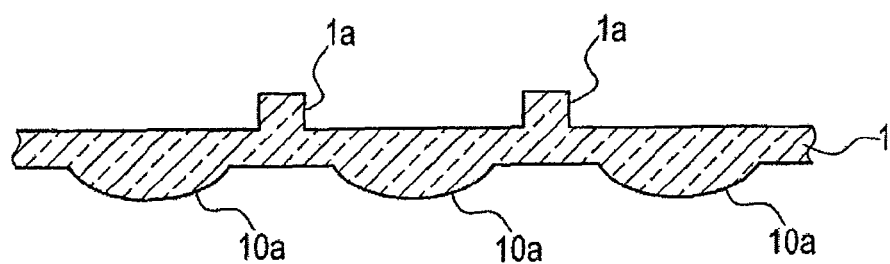
FIGS. 10A to 10C are cross-sectional views illustrating an example of a process of manufacturing the wafer-level lens array shown in FIG. 9.
Figure 10B:
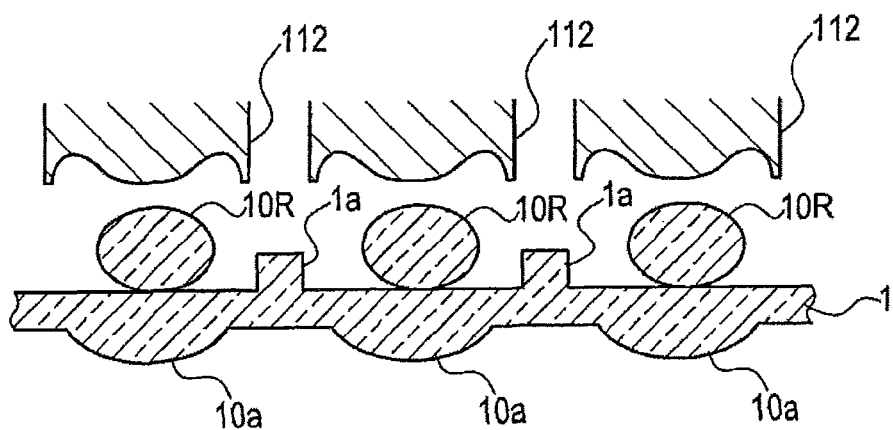
Figure 10C:
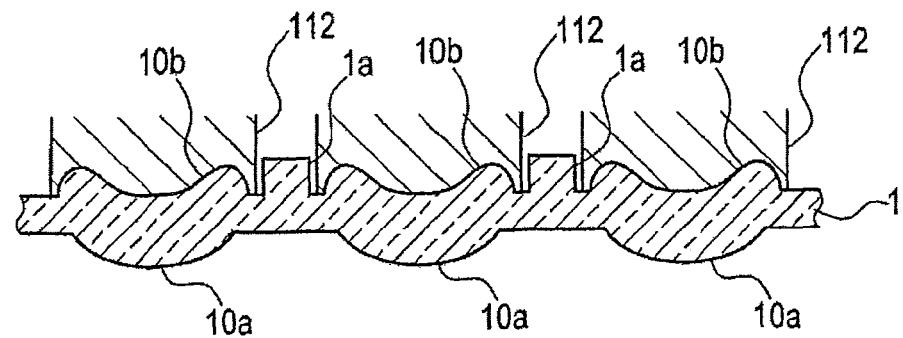

FIGS. 10A to 10C are cross-sectional views illustrating an example of the procedure of a process of manufacturing the wafer-level lens array shown in FIG. 9.

As shown in FIG. 10A, the lens units 10a are integrally formed with the substrate unit 1 having the concave portions 1a in the same procedure as described above.

Then, as shown in FIG. 10B, the amount of resin 10R corresponding to one lens unit 10b is supplied to each of the concave portions 1a of the substrate unit 1. The resin 10R is the same as that forming the substrate unit 1 and the lens unit 10a. The resin 10R is supplied to each of the concave portions 1a by the dispenser shown in FIG. 6. Then, as shown in FIG. 10C, after the resin 10R is supplied, the resin 10R in the concave portions 1a is pressed by a mold 112 having lens transfer portions for transferring the shape of the lens unit 10b. Ultraviolet rays or heat is applied to the pressed resin 10R to cure the resin 10R. In this way, it is possible to integrally form the lens units 10b with the substrate unit 1.

Figure 11A:
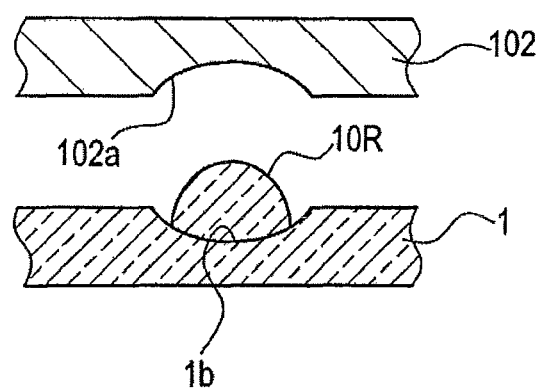
FIGS. 11A and 11B are diagrams illustrating a preferred example of supplying a resin to the substrate unit.
Figure 11B:
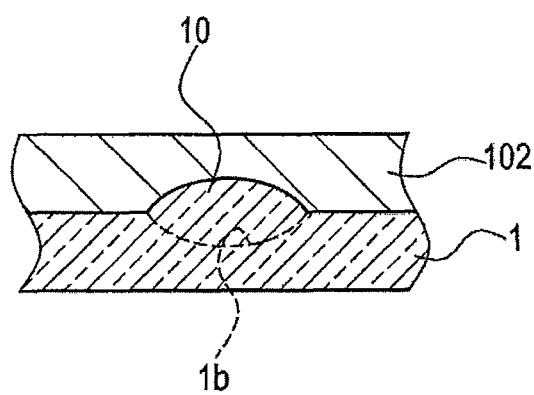

FIGS. 11A and 11B are diagrams illustrating a preferred example of the supply of the resin to the substrate unit.

As shown in FIG. 11A, a groove 1b for holding the resin 10R, which is a forming material, may be provided in a portion of the substrate unit 1 where the lens unit 10 is formed. In this case, as shown in FIG. 11B, the lens transfer portion 102a of the mold 102 is pressed to form the lens unit, with the resin 10R held in the groove 1b. Therefore, it is possible to prevent the resin 10R supplied to the groove 1b from being spread in the plane direction (the left-right direction of FIG. 11A) of the substrate unit 1. When the resin 10R is supplied to a plurality of portions of the substrate unit 1, it is considered that the difference between the shapes of the formed lens units occurs due to the difference between the spread of the resin 10R that is supplied at the beginning and the spread of the resin 10R that is supplied last. However, in this structure, since the groove 1b holds the supplied resin 10R, it is possible to prevent the difference between the shapes of the formed lens units.

Figure 12A:
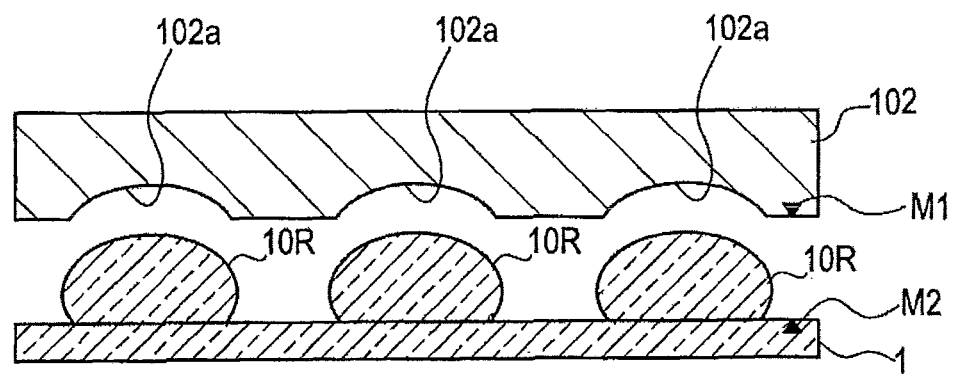
FIGS. 12A and 12B are diagrams illustrating another example of forming the lens units integrally with the substrate unit.
Figure 12B:
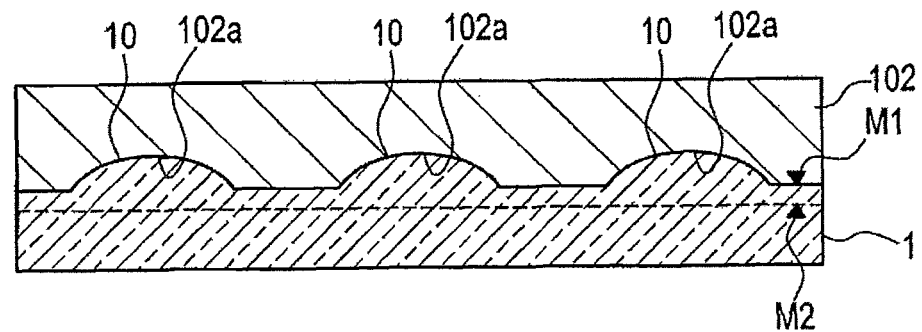

FIGS. 12A and 12B are diagrams illustrating another example of the process of forming the lens units 10 integrally with the substrate unit 1.

First, as shown in FIG. 12A, the resin 10R is supplied to portions of the substrate unit 1 where the lens units 10 will be formed. The amount of resin 10R applied to each of the portions is more than that corresponding to the lens unit 10.

Then, as shown in FIG. 12B, the mold 102 overlaps the substrate unit 1 and is pressed to deform the resin 10R into a shape corresponding to the shape of the lens transfer portion 102a. In this case, since a large amount of resin 10R is supplied, the resins 10R adjacent to each other on the substrate unit 1 are integrated. Then, the entire resin 10R becomes a surface layer covering the surface of the substrate unit 1, and the surface layer is deformed to include a plurality of lens units 10. Ultraviolet rays or heat is applied to the resin 10R to cure the resin 10R, with the substrate unit 1 and the mold 102 overlapped with each other. As a result, the thickness of the substrate unit 1 is substantially increased, and the plurality of lens units 10 is integrally formed on the surface whose thickness is increased.

As shown in FIGS. 12A and 12B, the marking portions M1 and M2 are provided in the substrate unit 1 and the mold 102, respectively. Therefore, it is possible to easily position the plurality of lens units 10 with respect to the substrate unit 1.

Figure 13A:
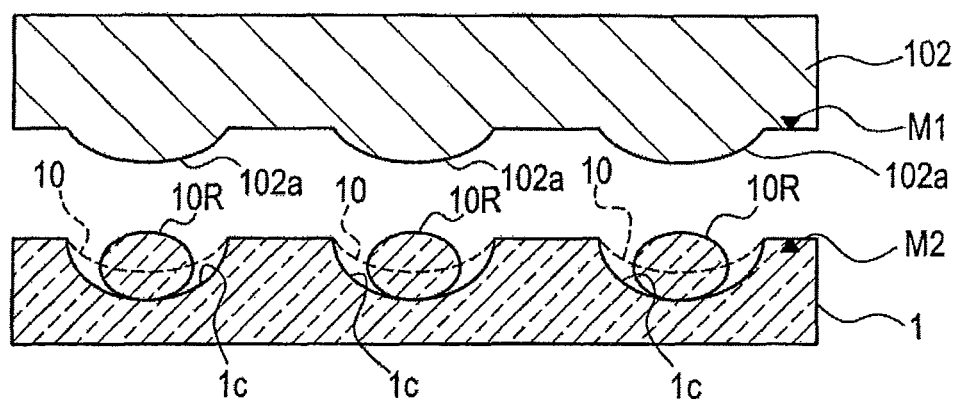
FIGS. 13A and 13B are diagrams illustrating another example of forming the lens units integrally with the substrate unit.
Figure 13B:
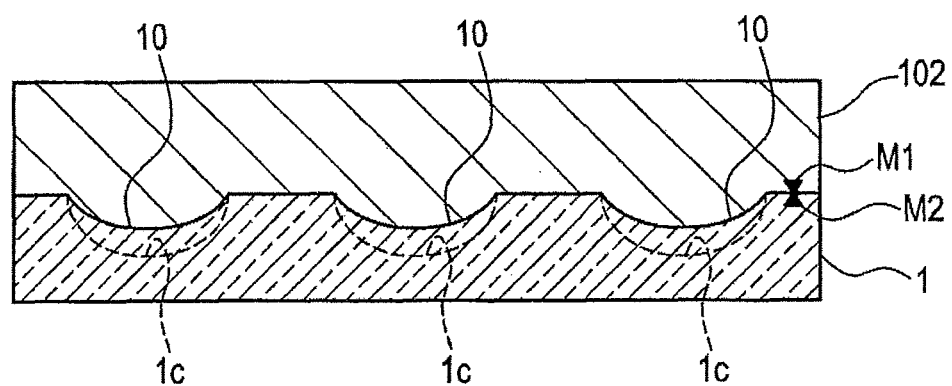

FIGS. 13A and 13B are diagrams illustrating still another example of the process of forming the lens units 10 integrally with the substrate unit 1.

As shown in FIG. 13A, lens forming holes 1c are provided in one surface of the substrate unit 1 on which the lens units 10 are formed so as to correspond to the lens units 10 in advance. The lens forming holes 1c may be provided at the same time as the substrate unit 1 is formed, or a process of cutting out portions corresponding to the lens forming holes 1c from the formed substrate unit 1 may be separately performed.

The resin 10R is supplied to the lens forming holes 1c of the substrate unit 1. The resin 10R may be supplied to each of the lens forming holes 1c by the dispenser shown in FIG. 6.

As shown in FIG. 13B, the mold 102 overlaps the substrate unit 1 and is pressed to deform the resin 10R into a shape corresponding to the shape of the lens transfer portion 102a of the mold 102 (in this case, a convex shape). Then, ultraviolet rays or heat is applied to the resin 10R to integrally form the concave lens units 10 in the lens forming holes 1c of the substrate unit 1. In this structural example, the lens unit 10 is not limited to the concave shape, but may have an aspheric shape or other shapes.

As shown in FIGS. 13A and 13B, the marking portions M1 and M2 are provided in the substrate unit 1 and the mold 102, respectively. Therefore, it is possible to easily position the plurality of lens units 10 with respect to the substrate unit 1.

Figure 14:
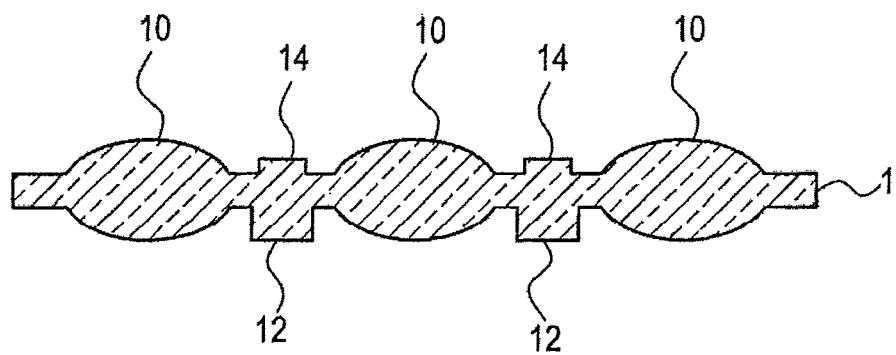
FIG. 14 is a diagram illustrating another example of the structure of the substrate unit.

FIG. 14 is a diagram illustrating another example of the structure of the substrate unit 1. As shown in FIG. 14, thick ribs 14 for preventing the warp of the substrate unit 1 may be provided in a region of the substrate unit 1 other than the portions where the lens units 10 are formed. In this case, the rigidity of the substrate unit 1 is improved at the positions where the ribs are provided, and it is possible to prevent the warp of the substrate unit 1. The ribs 14 may be formed on the surface of the substrate unit 1 in a lattice shape, a radial shape, or a circular ring shape. However, the shape of the rib 14 is not particularly limited.

Spacers 12 for overlap with other members may be provided in a region of the substrate unit 1 other than the portions where the lens units 10 are formed. For example, other members include other wafer-level lens arrays or other semiconductor substrates. In this case, it is possible to omit a process of providing separate spacers for overlapping the wafer-level lens array with another wafer-level lens array or another semiconductor substrate.

The spacers 12 made of a material different from that forming the substrate unit 1 or the lens unit 10 may be separately attached.

Next, the procedure of a process of manufacturing a lens module and an imaging unit using the wafer-level lens array will be described.

Figure 15A:
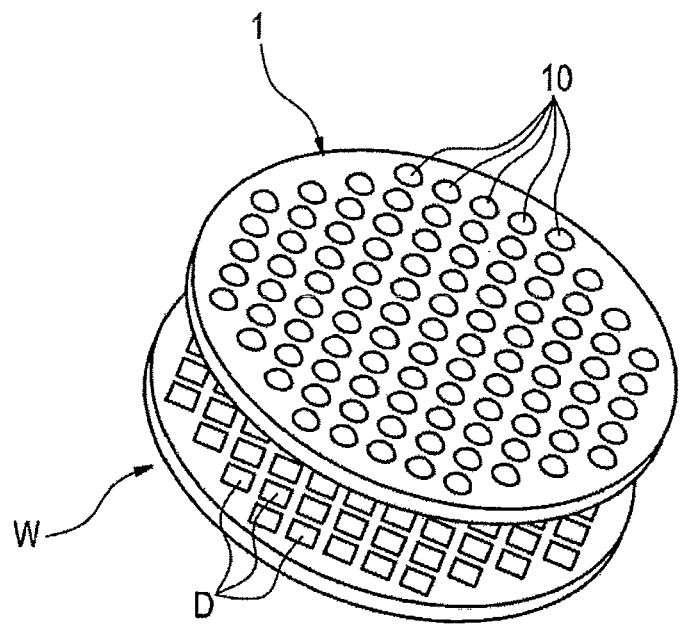
FIGS. 15A and 15B are diagrams illustrating a process of dicing the wafer-level lens array.
Figure 15B:
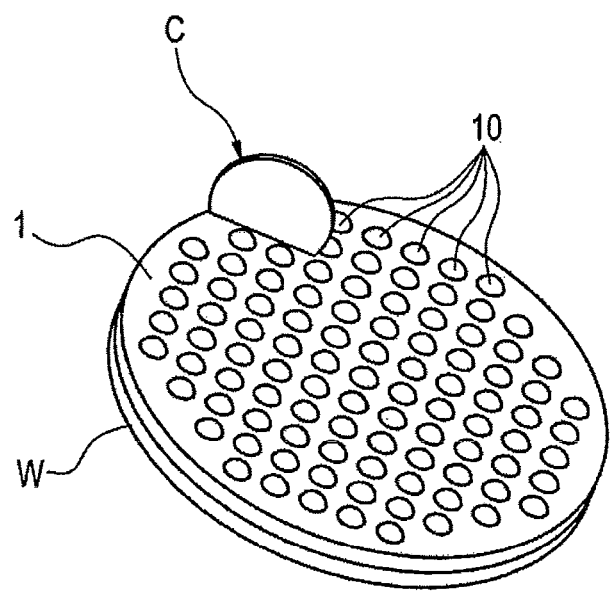

FIGS. 15A and 15B are diagrams illustrating a process of dicing the wafer-level lens array. The spacers 12 are integrally formed on one surface (in FIGS. 15A and 15B, the lower surface) of the substrate unit 1 of the wafer-level lens array.

As shown in FIG. 15B, the substrate unit 1 of the wafer-level lens array is aligned with the semiconductor substrate W that is formed in a wafer shape similar to the substrate unit 1. The arrangement of the solid-state imaging elements D provided on one surface (the upper surface in FIG. 15B) of the semiconductor substrate W is the same as that of the plurality of lens units 10 provided on the substrate unit 1. The substrate unit 1 of the wafer-level lens array is overlapped and integrally bonded to the semiconductor substrate W that is formed in a wafer shape similar to the substrate unit 1, with the spacers 12 (see FIG. 14) interposed therebetween. Then, the integrated wafer-level lens array and semiconductor substrate W are cut into a plurality of imaging units by a cutting means, such as a blade C, along the cut lines that are defined between rows of the lens units 10 and rows of the solid-state imaging elements D. For example, the cut lines are arranged in a lattice shape in a plan view of the substrate unit 1.

In this example, a dicing process when the imaging unit is manufactured is described. In the dicing process when the lens module is manufactured, the substrate unit is divided into a plurality of lens modules according to the arrangement of the lens units 10 without being bonded to the semiconductor substrate W.

Figure 16A:
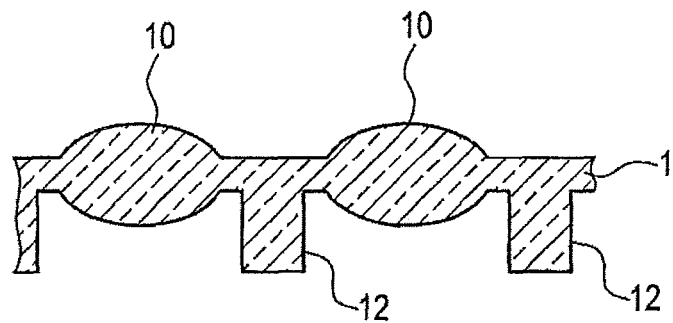
FIGS. 16A and 16B are diagrams illustrating the procedure of a method of manufacturing a lens module.
Figure 16B:
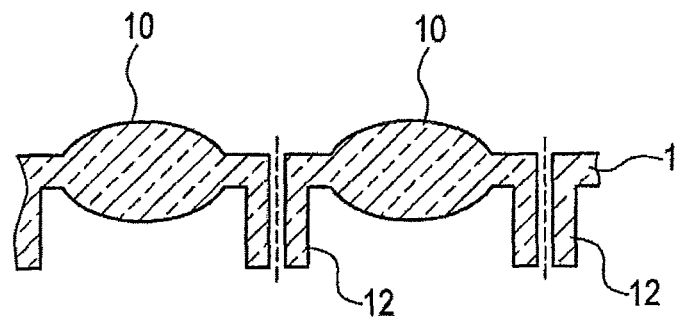

FIGS. 16A and 16B are diagrams illustrating the procedure of a method of manufacturing the lens module. In the procedure, an example in which the wafer-level lens array in which a plurality of lens units 10 is integrally formed with the substrate unit 1 is divided into a plurality of lens modules by dicing will be described.

First, as shown in FIG. 16A, a wafer-level lens array is prepared. The wafer-level lens array may be manufactured by the above-mentioned procedure. In the following description, a description of the procedure will be omitted.

Then, as shown in FIG. 16B, the substrate unit 1 of the wafer-level lens array is cut into a plurality of lens modules along the cut lines represented by dotted lines in FIG. 16B. In this case, the spacers 12 disposed on each of the cut lines are cut at the same time. The spacers 12 are divided along each of the cut lines and belong to the lens modules adjacent to each cut line. In this way, the lens modules are completed.

The divided lens module may be attached to a substrate including the sensor module or other optical elements (not shown) with the spacer 12 interposed therebetween.

As such, the spacers 12 are integrally formed with the substrate unit 1 of the wafer-level lens array in advance, and the substrate unit 1 of the wafer-level lens array is cut for each spacer 12 by the dicing process. In this case, it is possible to effectively mass-produce the lens modules and improve productivity, as compared to the structure in which the spacer 12 is bonded to each of the divided lens modules.

Figure 17:
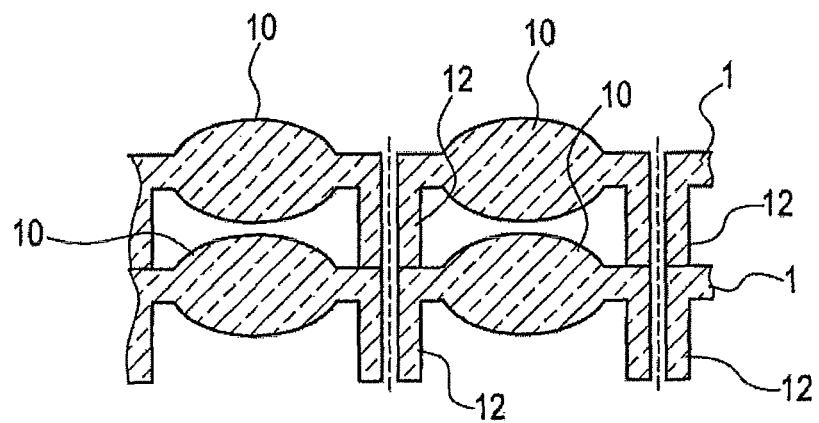
FIG. 17 is a diagram illustrating another example of the procedure of the method of manufacturing the lens module.

FIG. 17 is a diagram illustrating another example of the procedure of the method of manufacturing the lens module. In the procedure, an example in which a wafer-level lens array in which a plurality of lens units 10 is integrally formed with each of two substrate units 1 is divided into a plurality of lens modules by dicing will be described.

First, as shown in FIG. 17, a plurality of wafer-level lens arrays is prepared. The wafer-level lens arrays may be manufactured by the above-mentioned procedure. Therefore, a description of the procedure will be omitted. The spacers 12 are formed on one surface of each of the substrate units 1 of the plurality of wafer-level lens arrays. Then, the substrate units 1 of the wafer-level lens arrays to be overlapped are aligned with each other, and the lower surface of the substrate unit 1 of the wafer-level lens array to be overlapped is bonded to the upper surface of the substrate unit 1 of the lower wafer-level lens array with the spacers 12 interposed therebetween. The spacers 12 are arranged at the same positions with respect to the substrate units 1, with the wafer-level lens arrays overlapped with each other.

The substrate units 1 of the wafer-level lens arrays are cut into a plurality of lens modules along the cut lines represented by dotted lines in FIG. 17. In this case, the spacers 12 disposed on each of the cut lines are cut at the same time. The spacers 12 divided along each of the cut lines belong to the lens modules adjacent to each cut line. In this way, the lens modules including a plurality of lens units 10 are completed. In this procedure, the lens units 10 and the spacers 12 are arranged at the same positions with respect to each of the substrate units 1 to be overlapped. Therefore, a plurality of divided lens modules has the same structure. The positions of the cut lines may be determined on the basis of the uppermost one of the substrate units 1 to be overlapped, and the substrate units may be cut along the cut lines.

The divided lens module may be attached to a substrate including the sensor module or other optical elements (not shown) with the spacer 12 interposed therebetween.

As such, a plurality of wafer-level lens arrays overlaps each other and the substrate units 1 of the wafer-level lens arrays are cut along the spacers 12 by a dicing process. In this case, it is possible to effectively mass-produce the lens modules and improve productivity, as compared to the structure in which the divided lens modules individually overlap each other.

Figure 18A:
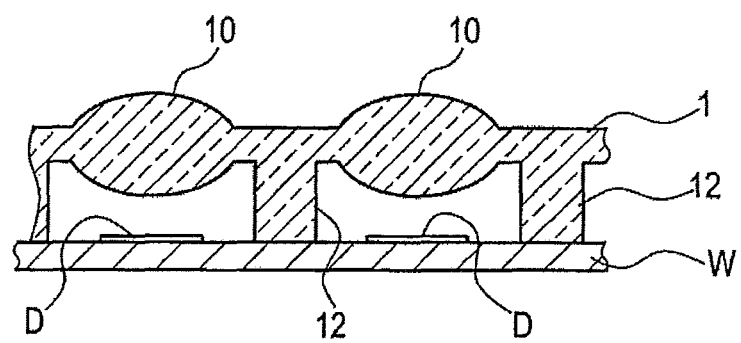
FIGS. 18A and 18B are diagrams illustrating the procedure of a process of manufacturing an imaging unit.
Figure 18B:
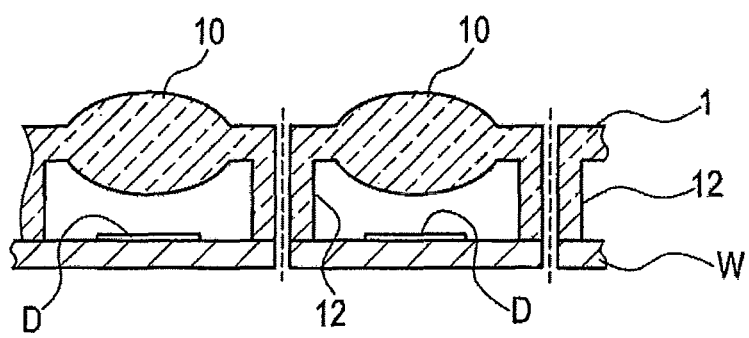

FIGS. 18A and 18B are diagrams illustrating the procedure of a method of manufacturing an imaging unit. In the procedure, an example in which one substrate unit 1 and the lens modules including a plurality of lens units 10 that is integrally formed with the substrate unit 1 are bonded to the sensor modules and the bonded body is divided into a plurality of imaging units by dicing will be described.

First, as shown in FIG. 18A, a wafer-level lens array is prepared. The wafer-level lens array may be manufactured by the above-mentioned procedure and a description of the procedure will be omitted. The spacers 12 are integrally formed on the lower surface of the substrate unit 1.

Then, a semiconductor substrate W having a plurality of solid-state imaging elements D arranged thereon is prepared. The substrate unit 1 of the wafer-level lens array is aligned with the semiconductor substrate W, and the substrate unit 1 is bonded to the upper surface of the semiconductor substrate W with the spacers 12 interposed therebetween. In this case, the extension line of the optical axis of each lens unit 10 provided in the substrate unit 1 intersects the center of the solid-state imaging element D.

Then, as shown in FIG. 18B, the substrate unit 1 of the wafer-level lens array is bonded to the semiconductor substrate W, and the substrate unit 1 is divided into a plurality of imaging units along the cut lines represented by dotted lines in FIG. 18B. In this case, the spacers 12 disposed on each of the cut lines are cut at the same time. The spacers 12 are divided along each of the cut lines and belong to the imaging units adjacent to each cut line. In this way, the imaging units are completed.

As such, the spacers 12 are formed on the wafer-level lens array in advance, the substrate of the wafer-level lens array overlaps the semiconductor substrate W including the solid-state imaging elements D, and the substrate unit 1 and the semiconductor substrate W are divided at the same time by a dicing process. In this case, it is possible to effectively mass-produce the imaging units and improve productivity, as compared to the structure in which the sensor modules are bonded to the divided lens modules with the spacers 12 interposed therebetween to manufacture the imaging units.

Figure 19A:
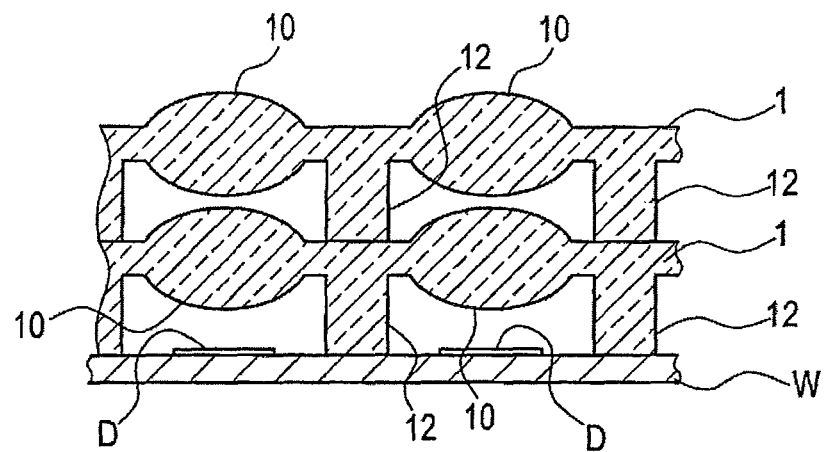
FIGS. 19A and 19B are diagrams illustrating another example of the procedure of the process of manufacturing the imaging unit.
Figure 19B:
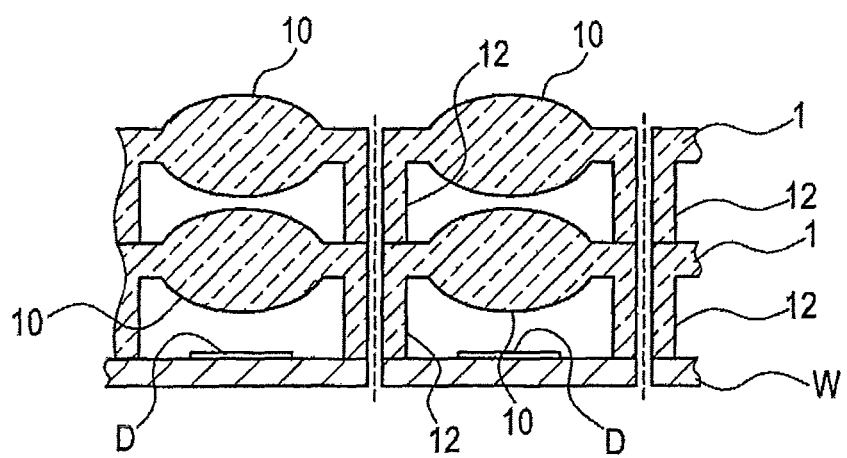

FIGS. 19A and 19B are diagrams illustrating another example of the procedure of the method of manufacturing the imaging unit. In the procedure, an example in which wafer-level lens arrays including two substrate units 1 and a plurality of lens units 10 that is integrally formed with each of the substrate units 1 are bonded to the semiconductor substrate having the solid-state imaging elements formed thereon and the bonded body is divided into a plurality of imaging units each having two lens units 10 by dicing will be described.

First, as shown in FIG. 19A, two wafer-level lens arrays are prepared. The wafer-level lens array may be manufactured by the above-mentioned procedure and a description of the procedure will be omitted. The spacers 12 are formed on the lower surface of each of the two substrate units 1 to be overlapped with each other in advance. Then, the substrate units 1 of the wafer-level lens arrays to be overlapped are aligned with each other, and the lower surface of the substrate unit 1 of the upper wafer-level lens array is bonded to the upper surface of the substrate unit 1 of the lower wafer-level lens array with the spacers 12 interposed therebetween. The spacers 12 are disposed at the same positions with respect to the substrate units 1, with the wafer-level lens arrays overlapped with each other.

Then, the semiconductor substrate W having a plurality of solid-state imaging elements D arranged thereon is prepared. The substrate units 1 of the overlapped wafer-level lens arrays are aligned with the semiconductor substrate W. Then, the lowest substrate unit 1 is bonded to the upper surface of the semiconductor substrate W with the spacers 12 interposed therebetween. In this case, the extension line of the optical axis of each lens unit 10 provided in the substrate unit 1 intersects the center of the solid-state imaging element D.

Then, as shown in FIG. 19B, the substrate unit 1 of the wafer-level lens array is bonded to the semiconductor substrate W, and the substrate unit 1 and the semiconductor substrate W are divided into a plurality of imaging units along the cut lines represented by dotted lines in FIG. 19B. In this case, the spacers 12 disposed on each of the cut lines are cut at the same time. The spacers 12 are divided along each of the cut lines and belong to the imaging units adjacent to each cut line. In this way, the imaging unit having a plurality of lens units 10 is completed.

As such, a plurality of wafer-level lens arrays is bonded to each other with the spacers 12 interposed therebetween and the substrate unit 1 of the lowest wafer-level lens array overlaps the semiconductor substrate W including the solid-state imaging elements D. Then, the substrate units 1 and the semiconductor substrate W are divided at the same time by a dicing process. In this procedure, it is possible to effectively mass-produce the imaging units and improve productivity, as compared to the structure in which the divided lens modules overlap each other, and the lens modules are bonded to the sensor modules to manufacture the imaging units.

The specification discloses the following content.

According to a first aspect, there is provided a method of manufacturing a wafer-level lens array including a substrate unit and a plurality of lens units that is arranged on the substrate unit. The method includes: forming the substrate unit; and integrally forming the lens units that are made of a resin having substantially the same optical characteristics as a material forming the substrate unit with the substrate unit.

According to a second aspect of the invention, in the method of manufacturing a wafer-level lens array according to the first aspect, the resin having substantially the same optical characteristics as the material forming the substrate unit may be supplied to the formed substrate unit.

According to a third aspect of the invention, in the method of manufacturing a wafer-level lens array according to the second aspect, the amount of resin corresponding to one lens unit may be supplied to each portion of the substrate unit in which the lens unit is formed.

According to a fourth aspect of the invention, in the method of manufacturing a wafer-level lens array according to the first aspect, before the lens units are formed integrally with the substrate unit, the resin may be supplied to a plurality of lens transfer portions of a mold for forming the plurality of lens units.

According to a fifth aspect of the invention, in the method of manufacturing a wafer-level lens array according to the fourth aspect, before the lens units are formed integrally with the substrate unit, the amount of resin corresponding to one lens unit may be supplied to each of the plurality of lens transfer portions.

According to a sixth aspect of the invention, in the method of manufacturing a wafer-level lens array according to any one of the first to fifth aspects, in the forming of the substrate unit, a block made of the forming material may be divided into the substrate unit.

According to a seventh aspect of the invention, in the method of manufacturing a wafer-level lens array according to any one of the first to sixth aspects, ribs with a sufficient thickness to prevent the warp of the substrate unit may be formed in a region of the substrate unit other than the portions in which the lens units are formed.

According to an eighth aspect of the invention, in the method of manufacturing a wafer-level lens array according to any one of the first to seventh aspects, spacers used when the substrate unit overlaps other members may be formed in the region of the substrate unit other than the portions in which the lens units are formed.

According to a ninth aspect of the invention, in the method of manufacturing a wafer-level lens array according to any one of the first to eighth aspects, a marking portion, which is a reference point for positioning the lens units when the lens units are formed, may be provided in the substrate unit.

According to a tenth aspect of the invention, in the method of manufacturing a wafer-level lens array according to any one of the first to ninth aspects, concave portions or convex portions may be provided on one surface of the substrate unit on which the lens units are formed, and the concave portion or the convex portion may be wider than the region in which the lens unit is formed.

According to an eleventh aspect of the invention, in the method of manufacturing a wafer-level lens array according to any one of the first to tenth aspects, grooves for holding the forming material may be provided in the portions of the substrate unit in which the lens units are formed. When the lens units are formed, the material forming the lens units may be held in the grooves.

According to a twelfth aspect of the invention, in the method of manufacturing a wafer-level lens array according to any one of the first to eleventh aspects, when the plurality of lens units is formed, the supplied forming material may be integrated with the surface of the formed substrate unit to form a layer forming the surface of the substrate unit and the lens units.

According to a thirteenth aspect of the invention, in the method of manufacturing a wafer-level lens array according to any one of the first to twelfth aspects, when the plurality of lens units is formed, the forming material may be supplied to each of a plurality of lens forming holes that is formed in the substrate unit in advance and then molded to form the lens unit in each of the lens forming holes.

According to a fourteenth aspect of the invention, there is provided a wafer-level lens array that is manufactured by the method of manufacturing a wafer-level lens array according to any one of the first to thirteenth aspects.

According to a fifteenth aspect of the invention, there is provided a lens module that is obtained by dicing the substrate unit of the wafer-level lens array according to the fourteenth aspect for each lens unit.

According to a sixteenth aspect of the invention, there is provided a lens module that is obtained by dicing the substrate unit of the wafer-level lens array according to the eighth aspect for each lens unit. The lens module includes a plurality of the substrate units each having the lens unit formed therein. The plurality of substrate units overlaps each other with the spacers interposed therebetween.

According to a seventeenth aspect of the invention, an imaging unit includes: the lens module according to the sixteenth aspect; an imaging element; and a semiconductor substrate on which the imaging element is formed. The substrate unit is integrally bonded to the semiconductor substrate with the spacers interposed therebetween.

The method of manufacturing the wafer-level lens array can be applied to manufacture imaging lenses provided in imaging apparatuses, such as digital cameras, endoscopes, and portable electronic apparatuses.

What is claimed is:
1. A method of manufacturing a wafer-level lens array including a substrate unit and a plurality of lens units that is arranged on the substrate unit, comprising:
   forming the substrate unit by dividing a block made of a forming material; and
   integrally forming the lens units that are made of a resin having substantially the same optical characteristics as the forming material of the substrate unit with the substrate unit;
   integrally forming ribs with a sufficient thickness to prevent the warp of the substrate unit in a region of the substrate unit other than the portions in which the lens units are formed,
   wherein the resin having substantially the same optical characteristics as the material forming the substrate unit is supplied to the formed substrate unit, and
   an amount of resin corresponding to one lens unit is supplied to each portion of the formed substrate unit in which the lens unit is formed.

2. The method of manufacturing a wafer-level lens array according to claim 1,
wherein spacers used when the substrate unit overlaps other members are formed in the region of the substrate unit other than the portions in which the lens units are formed.

3. A lens module obtained by dicing the substrate unit of the wafer-level lens array according to claim 2 for each lens unit, comprising:
a plurality of the substrate units each having the lens unit formed therein,
wherein the plurality of substrate units overlaps each other with the spacers interposed therebetween.

4. An imaging unit comprising:
the lens module according to claim 3;
an imaging element; and
a semiconductor substrate on which the imaging element is formed,
wherein the substrate unit is integrally bonded to the semiconductor substrate with the spacers interposed therebetween.

5. The method of manufacturing a wafer-level lens array according to claim 1,
wherein a marking portion, which is a reference point for positioning the lens units when the lens units are formed, is provided in the substrate unit.

6. The method of manufacturing a wafer-level lens array according to claim 1,
wherein concave portions or convex portions are provided on one surface of the substrate unit on which the lens units are formed, and
the concave portion or the convex portion is wider than the region in which the lens unit is formed.

7. The method of manufacturing a wafer-level lens array according to claim 1,
wherein grooves for holding the forming material are provided in the portions of the substrate unit in which the lens units are formed, and
when the lens units are formed, the material forming the lens unit is held in the grooves.

8. The method of manufacturing a wafer-level lens array according to claim 1,
wherein, when the plurality of lens units is fanned, the supplied forming material is integrated with the surface of the formed substrate unit to form a layer forming the surface of the substrate unit and the lens units.

9. The method of manufacturing a wafer-level lens array according to claim 1,
wherein, when the plurality of lens units is formed, the forming material is supplied to each of a plurality of lens forming holes that is formed in the substrate unit in advance and is molded to form the lens unit in each of the lens forming holes.

10. A wafer-level lens array manufactured by the method of manufacturing a wafer-level lens array according to claim 1.

11. A lens module that is obtained by dicing the substrate unit of the wafer-level lens array according to claim 10 for each lens unit.

12. A method of manufacturing a wafer-level lens array including a substrate unit and a plurality of lens units that is arranged on the substrate unit, comprising:
forming the substrate unit by dividing a block made of a forming material; and
integrally forming the lens units that are made of a resin having substantially the same optical characteristics as the forming material of the substrate unit with the substrate unit;
integrally forming ribs with a sufficient thickness to prevent the warp of the substrate unit in a region of the substrate unit other than the portions in which the lens units are formed,
wherein, before the lens units are formed integrally with the substrate unit, the resin is supplied to a plurality of lens transfer portions of a mold for forming the plurality of lens units, and
before the lens units are formed integrally with the substrate unit, an amount of resin corresponding to one lens unit is supplied to each of the plurality of lens transfer portions.

* * * * *